US 10,293,373 B2

United States Patent
Steinmetz et al.

(10) Patent No.: US 10,293,373 B2
(45) Date of Patent: May 21, 2019

(54) METHOD FOR PRODUCING AND REPAIRING A MULTICOAT COLOR AND/OR EFFECT PAINT SYSTEM

(71) Applicant: BASF Coatings GmbH, Münster (DE)

(72) Inventors: Bernhard Steinmetz, Rütschenhausen (DE); Michael Matura, Kitzingen (DE); Bianca Göb, Werneck (DE); Peter Hoffmann, Senden (DE)

(73) Assignee: BASF Coatings GmbH, Muenster (DE)

( * ) Notice: Subject to any disclaimer, the term of this patent is extended or adjusted under 35 U.S.C. 154(b) by 186 days.

(21) Appl. No.: 14/429,164

(22) PCT Filed: Sep. 20, 2013

(86) PCT No.: PCT/EP2013/069609
§ 371 (c)(1),
(2) Date: Mar. 18, 2015

(87) PCT Pub. No.: WO2014/044814
PCT Pub. Date: Mar. 27, 2014

(65) Prior Publication Data
US 2015/0225578 A1     Aug. 13, 2015

Related U.S. Application Data

(60) Provisional application No. 61/703,798, filed on Sep. 21, 2012.

(30) Foreign Application Priority Data

Sep. 21, 2012 (EP) ..................... 12185453

(51) Int. Cl.

| | |
|---|---|
| *B05D 5/06* | (2006.01) |
| *C09D 4/06* | (2006.01) |
| *B05D 7/00* | (2006.01) |
| *C08G 18/08* | (2006.01) |
| *C09D 175/04* | (2006.01) |
| *C09D 7/63* | (2018.01) |

(52) U.S. Cl.
CPC .............. *B05D 7/572* (2013.01); *B05D 5/06* (2013.01); *C08G 18/0823* (2013.01); *C09D 4/06* (2013.01); *C09D 7/63* (2018.01); *C09D 175/04* (2013.01)

(58) Field of Classification Search
None
See application file for complete search history.

(56) References Cited

U.S. PATENT DOCUMENTS

| | | | |
|---|---|---|---|
| 2,915,496 A | 12/1959 | Swart et al. | |
| 4,914,148 A | 4/1990 | Hille et al. | |
| 5,334,420 A | 8/1994 | Hartung et al. | |
| 5,368,944 A | 11/1994 | Hartung et al. | |
| 5,658,617 A | 8/1997 | Gobel et al. | |
| 5,792,806 A | 8/1998 | Yamamoto et al. | |
| 5,916,965 A * | 6/1999 | Matsumoto | ......... C08F 290/147 524/507 |
| 6,001,915 A * | 12/1999 | Schwarte | ............ C08F 283/006 524/457 |
| 6,583,214 B1 | 6/2003 | Haeberle et al. | |
| 6,632,915 B1 | 10/2003 | Schwarte et al. | |
| 6,737,468 B1 | 5/2004 | Bremser | |
| 8,211,504 B2 | 7/2012 | Wegner et al. | |
| 2003/0175434 A1 | 9/2003 | Wegner et al. | |
| 2006/0121204 A1* | 6/2006 | Nakae | ................ C08G 18/0823 427/402 |

(Continued)

FOREIGN PATENT DOCUMENTS

| | | |
|---|---|---|
| DE | 4009858 | 10/1991 |
| DE | 19914896 | 10/2000 |

(Continued)

OTHER PUBLICATIONS

Paint Scratch, Paint Scratch Automotive Touch Up Paint, http://www.paintscratch.com/touch-up-paint-directions/tricoat.htm, Retrieved on Mar. 14, 2017; Posted on Feb. 1, 2002 p. 1-3.*

(Continued)

*Primary Examiner* — Francisco W Tschen
(74) *Attorney, Agent, or Firm* — Oblon, McClelland, Maier & Neustadt, L.L.P.

(57) ABSTRACT

Described is a method for producing a multicoat color and/or effect paint system. A pigmented aqueous basecoat material is used which comprises at least one phosphite of the formula (I):

$$R^1\diagdown_O\diagdown_P\diagdown_O\diagdown R^3$$
$$\phantom{R^1\diagdown_O\diagdown_P}\Big|$$
$$\phantom{R^1\diagdown_O\diagdown_P\diagdown}O\diagdown_{R^2}$$

(I)

wherein at least one of the radicals $R^1$ to $R^3$ is selected from the group of aliphatic hydrocarbons. The sum total of the weight percentage fractions of all of the phosphites of structural formula (I) here is 0.1% to 5% by weight, based on the total weight of the basecoat material used. Moreover, described are the corresponding basecoat materials, the corresponding multicoat color and/or effect paint system, and the use of the phosphites in pigmented aqueous coating materials. Also described is a method for repairing defects on multicoat color and/or effect paint systems produced with the aid of the above-identified method of the invention.

9 Claims, No Drawings

(56) References Cited

U.S. PATENT DOCUMENTS

2009/0209701 A1* 8/2009 Steinmetz .............. C08G 18/44
524/612

FOREIGN PATENT DOCUMENTS

| DE | 19930665 | 1/2001 |
| DE | 19948004 | 7/2001 |
| DE | 10043405 | 6/2002 |
| EP | 0228003 | 7/1987 |
| EP | 0521928 | 1/1993 |
| EP | 0634431 | 1/1995 |
| JP | 10-028924 | 2/1998 |
| WO | WO-91/15528 | 10/1991 |
| WO | WO-92/15405 | 9/1992 |

OTHER PUBLICATIONS

PCT International Search Report in PCT/EP2013/069609, dated Jan. 24, 2014, 2 pages.

* cited by examiner

METHOD FOR PRODUCING AND REPAIRING A MULTICOAT COLOR AND/OR EFFECT PAINT SYSTEM

CROSS-REFERENCE TO RELATED APPLICATIONS

This is application is the National Stage Entry of PCT/EP2013/069609, filed Sep. 20, 2013, which claims priority to U.S. Provisional Application Ser. No. 61/703,798, filed Sep. 21, 2012, and European Patent Application 12185453.3, filed Sep. 21, 2012, the disclosures of which are incorporate herein by reference in their entireties.

TECHNICAL FIELD

The invention relates to a method for producing a multicoat color and/or effect paint system, by
(1) applying a pigmented aqueous basecoat material to the substrate,
(2) forming a polymer film from the coating material applied in stage (1),
(3) applying a clearcoat material to the resulting basecoat film, and subsequently
(4) curing the basecoat film together with the clearcoat film.

The invention further relates to a multicoat color and/or effect paint system which is producible by the above-identified method, and also to a method for repairing defects on said multicoat color and/or effect paint system, by
(1) applying a pigmented aqueous basecoat material to the defect,
(2) forming a polymer film from the coating material applied in stage (1),
(3) applying a clearcoat material to the resulting basecoat film, and subsequently
(4) curing the basecoat film together with the clearcoat film.

The invention further relates to pigmented aqueous basecoat materials which are suitable for producing multicoat color and/or effect paint systems, and also to the use of phosphites in pigmented aqueous basecoat materials.

BACKGROUND

The above-described method is known (e.g., German patent application DE 199 48 004 A1, page 17, line 37, to page 19, line 22, or German patent DE 100 43 405 C1, column 3, paragraph[0018], and column 8, paragraph[0052], to column 9, paragraph[0057], in conjunction with column 6, paragraph[0039], to column 8, paragraph[0050]) and is widely used, for example, not only for the OEM finishing but also for the refinishing of automobile bodies.

The use of phosphites in coating systems is known in principle. JP 10028924 is concerned, for example, with lowering the yellowing of coating material compositions for the coating of bumpers. The use of phosphites in solvent-based coating systems is described.

With the so-called basecoat/clearcoat method in question, using a wet-on-wet process, multicoat color and/or effect paint systems are obtained. In the course in particular of automotive OEM finishing, defects may occur in the resultant finish. Where defects are found in this finish—known as the original finish—the original finish is repaired. Where the original finish, for example, has defects extensively, the entire body or at least a corresponding portion is repaired, in other words painted a second time. Where only small defects require repair, it is only the so-called "spot" that is repaired, not the entire body. This operation is called "spot repair".

The corresponding finish must subsequently be stable toward moisture exposure—that is, after the so-called atmospheres test according to EN ISO 6270-2, for example, there must be no observable swelling or blistering at all. The aforementioned defects of swelling and blistering are also identified as reversible defects, since after corresponding condensation water exposure they may disappear again in a subsequent regeneration.

SUMMARY

A first aspect of the present invention is directed to a method for producing a multicoat color and/or effect system. In a first embodiment, a method for producing a multicoat color and/or effect paint system comprises (1) applying a pigmented aqueous basecoat material to a substrate; (2) forming a polymer film from the coating material applied in stage (1); (3) applying a clearcoat material to the resultant basecoat film; and subsequently (4) curing the basecoat film together with the clearcoat film, wherein in stage (1) a pigmented aqueous basecoat material is used which comprises at least one phosphite of the following structural formula (I):

(I) wherein at least one of the radicals R1 to R3 is selected from the group of aliphatic hydrocarbons and, wherein the sum total of the weight percentage fractions of all of the phosphites of structural formula (I) is 0.1% to 5% by weight, based on the total weight of the aqueous basecoat material applied in stage (1).

In a second embodiment, the method of the first embodiment is modified, wherein the sum total of the weight percentage fractions of all of the phosphites of structural formula (I) is 0.1% to 4.5% by weight, based on the total weight of the aqueous basecoat material applied in stage (1).

In a third embodiment, the method of the first and second embodiments is modified, wherein in stage (1) the pigmented aqueous basecoat material further comprises a binder comprising at least one saturated or unsaturated polyurethane resin.

In a fourth embodiment, the method of the first through third embodiments is modified, wherein in stage (1) the pigmented aqueous basecoat material further comprises at least one crosslinking agent selected from the group consisting of amino resins and blocked or nonblocked polyisocyanates.

In a fifth embodiment, the method of the first through fourth embodiments is modified, wherein the aliphatic hydrocarbons comprise a C1-C20 radical.

In a sixth embodiment, the method of the first through fifth embodiments is modified, wherein the aliphatic hydrocarbons each comprise an isoalkyl radical of the general formula —$(CH_2)_n$-$CH(CH_3)_2$ wherein $n=1$ to 17.

In a seventh embodiment, the method of the first through sixth embodiments is modified, wherein the at least one phosphite is selected from the group consisting of triisodecyl phosphite, triisotridecyl phosphite and phenyl diisodecyl phosphite.

A second aspect of the present invention is directed to a multicoat color and/or effect paint system. In an eighth embodiment, a multicoat color and/or effect paint system is produced by the method of the first through seventh embodiments.

A third aspect of the present invention is directed to a method for repairing defects. In a ninth embodiment, a method for repairing defects on the multicoat color and/or effect paint system of the eight embodiment comprises (1) applying a pigmented aqueous basecoat material to the defect; (2) forming a polymer film from the coating material applied in stage (1); (3) applying a clearcoat material to the resultant basecoat film; and subsequently (4) curing the basecoat film together with the clearcoat film, wherein in stage (1) a pigmented aqueous basecoat material is used which comprises at least one phosphite of the following structural formula (I):

(I) wherein at least one of the radicals R1 to R3 is selected from the group of aliphatic hydrocarbons and, wherein the sum total of the weight percentage fractions of all of the phosphites of structural formula (I) is 0.1% to 5% by weight, based on the total weight of the aqueous basecoat material applied in stage (1).

In a tenth embodiment, the method of the ninth embodiment is modified, wherein in stage (1) the pigmented aqueous basecoat material further comprises a binder comprising at least one saturated or unsaturated polyurethane resin.

In a eleventh embodiment, the method of the ninth and tenth embodiments is modified, wherein in stage (1) the pigmented aqueous basecoat material further comprises at least one crosslinking agent selected from the group consisting of amino resins and blocked or nonblocked polyisocyanates.

In a twelfth embodiment, the method of the ninth through eleventh embodiments is modified, wherein the aliphatic hydrocarbons comprise a C1-C20 radical.

In a thirteenth embodiment, the method of the ninth through twelfth embodiments is modified, wherein the at least one phosphite is selected from the group consisting of triisodecyl phosphite, triisotridecyl phosphite and phenyl diisodecyl phosphite.

A fourth aspect of the present invention is directed to a pigment aqueous basement. In a fourteenth embodiment, a pigmented aqueous basecoat material comprises at least one phosphite of formula (I):

(I), wherein at least one of the radicals R1 to R3 is selected from the group of aliphatic hydrocarbons and, wherein the sum total of the weight percentage fractions of all of the phosphites of formula (I) is 0.1% to 5% by weight, based on the total weight of the pigmented aqueous basecoat material.

DETAILED DESCRIPTION

Provided is a method of the type described above, by which multicoat color and/or effect paint systems are obtainable which, relative to the paint systems of the prior art, exhibit improved suitability of the coating material for refinishing. Provided also is a method by which defects on the above-identified multicoat color and/or effect paint systems can be repaired. An improved suitability of the coating material for refinishing means that after condensation water exposure and after a regeneration time of 24 hours, for example, the repaired paint systems no longer exhibit any of the above-identified reversible defects such as swelling and blistering.

In stage (1) of the above-described basecoat/clearcoat method, a pigmented aqueous basecoat material is used. The pigmented aqueous basecoat material comprises at least one phosphite of the following structural formula (I):

wherein at least one of the radicals $R^1$ to $R^3$ is selected from the group of the aliphatic hydrocarbons and, furthermore, the sum total of the weight percentage fractions of all of the phosphites of structural formula (I) is 0.1% to 5% by weight, based on the total weight of the aqueous basecoat material applied in stage (1).

In stage (1) of the method of the invention, it is possible, in principle, to use all known aqueous basecoat materials, provided that they contain at least one of the above-defined phosphates and that the sum total of the weight percentage fractions of all the phosphites of structural formula (I) is 0.1% to 5% by weight, based on the total weight of the aqueous basecoat material applied in stage (1). Basecoat materials are identified as "aqueous" when they contain 30% to 70% by weight of water, based on the total weight of the basecoat material. The terms "aqueous basecoat material" and "waterborne basecoat material" are used as synonymous terms in this specification.

In one or more embodiments, the basecoat materials comprise color and/or effect pigments. Color pigments and effect pigments of these kinds are known to the skilled person and are described for example in Römpp-Lexikon Lacke and Druckfarben, Georg Thieme Verlag, Stuttgart, N.Y., 1998, pages 176 and 451. The fraction of the pigments may be situated for example in the range from 1 to 40% by weight, or 2% to 20% by weight, more specifically 5% to 15% by weight, based on the total weight of the pigmented aqueous basecoat material.

In one or more embodiments, basecoat materials which, as binders, comprise binders that are curable physically, thermally, or both thermally and with actinic radiation are used.

As used herein, the term "(meth)acrylate" refers to both acrylate and to methacrylate. In other words, therefore, a corresponding polymer is constructed both of acrylates and of methacrylates. It may, however, equally well be constructed exclusively of acrylates or exclusively of methacrylates.

In one or more specific embodiment, at least one saturated or unsaturated polyurethane resin is present as binder. Coating materials of this kind comprising polyurethane resin may likewise typically be cured physically, thermally, or both thermally and with actinic radiation.

As used herein, the term "physical curing" denotes the formation of a film by loss of solvent from polymer solutions or polymer dispersions. Normally no crosslinking agents are necessary for such curing.

As used herein, the term "thermal curing" denotes the heat-initiated crosslinking of a coating film, for which either a separate crosslinking agent or else self-crosslinking binders is or are employed in the parent coating material. The crosslinking agent comprises reactive functional groups which are complementary to the reactive functional groups present in the binders. This is normally referred to by those in the art as external crosslinking. Where the complementary reactive functional groups or autoreactive functional groups—that is, groups which react with groups of the same kind—are already present in the binder molecules, the binders are self-crosslinking. Examples of suitable complementary reactive functional groups and autoreactive functional groups are known from German patent application DE 199 30 665 A1, page 7, line 28 to page 9, line 24.

As used herein, actinic radiation means electromagnetic radiation such as near infrared (NIR), UV radiation, more particularly UV radiation, and particulate radiation such as electron beams. Curing by UV radiation is typically initiated by radical or cationic photoinitiators.

Where thermal curing and curing with actinic light are employed jointly, the term "dual cure" is also used.

In one or more embodiments, basecoat materials which are curable thermally or both thermally and with actinic radiation, in other words by dual cure, are used. In more specific embodiments, basecoat materials which comprise a polyurethane resin as binder and an amino resin or a blocked or nonblocked polyisocyanate, more specifically an amino resin, are employed as crosslinking agent. Among the amino resins, melamine resins are used.

In one or more embodiments, the polyurethane resin that is present may have been hydrophilically stabilized ionically and/or nonionically. In embodiments of the present invention, the polyurethane resin is hydrophilically stabilized ionically. In one or more embodiments, the polyurethane resins are linear or contain branches.

In specific embodiments, the polyurethane resin is a resin which is connected with olefinically unsaturated monomers. Olefinically unsaturated monomers bonded to the polyurethane resin (A) are monomers containing acrylate and/or methacrylate groups, thereby forming polyurethane (meth) acrylates. In specific embodiments, the polyurethane resin is a polyurethane (meth)acrylate. The polyurethane resin present is curable physically, thermally, or both thermally and with actinic radiation. More particularly, it is curable thermally or both thermally and with actinic radiation. In specific embodiments, the polyurethane resin comprises reactive functional groups which allow external crosslinking.

Suitable saturated or unsaturated polyurethane resins are described in, for example German patent application DE 199 14 896 A1, column 1, lines 29 to 49 and column 4, line 23 to column 11, line 5;

German patent application DE 199 48 004 A1, page 4, line 19 to page 13, line 48;

European patent application EP 0 228 003 A1, page 3, line 24 to page 5, line 40;

European patent application EP 0 634 431 A1, page 3, line 38 to page 8, line 9; or international patent application WO 92/15405, page 2, line 35 to page 10, line 32.

For preparing the polyurethane resin aliphatic, cycloaliphatic, aliphatic-cycloaliphatic, aromatic, aliphatic-aromatic and/or cycloaliphatic-aromatic polyisocyanates that are known to the skilled person may be used.

As an alcohol component for preparing the polyurethane resins. saturated and unsaturated polyols of relatively high molecular mass and of low molecular mass, and also, optionally, monoalcohols as well, in minor amounts, may be used. Low molecular mass polyols, more particularly diols and, in minor amounts, triols, may be used for the purpose of introducing branches. Examples of suitable polyols of relatively high molecular mass are saturated or olefinically unsaturated polyester polyols and/or polyether polyols. Polyols of relatively high molecular mass include polyester polyols, more particularly those having a number-average molecular weight of 400 to 5000 g/mol (measured by gel permeation chromatography against a polystyrene standard, using tetrahydrofuran as eluent).

For the purpose of hydrophilic stabilization and/or for raising the dispersibility in an aqueous medium, the polyurethane resin may comprise certain ionic groups and/or groups which can be converted into ionic groups (potentially ionic groups). Such polyurethane resins are referred to herein as ionically hydrophilically stabilized polyurethane resins. Likewise present may be nonionic hydrophilically modifying groups. Preferred, however, are the ionic ally hydrophilically stabilized polyurethanes. More specifically the modifying groups are alternatively functional groups which can be converted by neutralizing agents and/or quaternizing agents in the cations, and/or cationic groups (cationic modification) or functional groups which can be converted by neutralizing agents into anions, and/or anionic groups (anionic modification) and/or nonionic hydrophilic groups (nonionic modification).

As the skilled person is aware, the functional groups for cationic modification are, for example, primary, secondary and/or tertiary amino groups, secondary sulfide groups and/ or tertiary phosphine groups, more particularly tertiary amino groups and secondary sulfide groups (functional groups which can be converted by neutralizing agents and/or quaternizing agents into cationic groups). Further deserving of mention are the cationic groups prepared from the aforementioned functional groups using neutralizing agents and/ or quaternizing agents that are known to the skilled person, said cationic groups being such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are, as is known, for example, carboxylic, sulfonic and/or phosphonic acid groups, especially carboxylic acid groups (functional groups which can be converted by neutralizing agents into anionic groups), and also anionic groups prepared from the aforementioned functional groups using neutralizing agents that are known to the skilled person, said anionic groups being such as carboxylate, sulfonate and/or phosphonate groups.

In one or more embodiments, the functional groups for nonionic hydrophilic modification are poly(oxyalkylene) groups, more particularly poly(oxyethylene) groups.

The ionically hydrophilic modifications may be introduced into the polyurethane resin by means of monomers which contain the (potentially) ionic groups. The nonionic modifications are introduced, for example, through the incorporation of poly(ethylene) oxide polymers as pendant or terminal groups of the polyurethane molecules. The hydrophilic modifications are introduced, for example, via compounds which comprise at least one group that is reactive toward isocyanate groups, preferably at least one hydroxyl group. For introducing the ionic modification it is possible to use monomers, which as well as the modifying groups, contain at least one hydroxyl group. For introducing the nonionic modifications polyetherdiols and/or alkoxypoly (oxyalkylene) alcohols that are known to the skilled person may be used.

The polyurethane resin may be a graft polymer. More particularly, the polyurethane resin is a polyurethane resin grafted by means of olefinically unsaturated compounds, preferably olefinically unsaturated monomers. In this case, therefore, the polyurethane is grafted, for example, with side groups and/or side chains which are based on olefinically unsaturated monomers. More particularly these are side chains based on poly(meth)acrylates. Poly(meth)acrylates in the context of the present invention are polymers or polymeric radicals which comprise acrylate- and/or methacrylate-group-containing monomers, consisting preferably of acrylate- and/or methacrylate-group-containing monomers. Side chains based on poly(meth)acrylates are side chains which are constructed in the course of graft polymerization using monomers containing (meth)acrylate groups. In the graft polymerization, in this case, more than 50 mol %, more particularly more than 75 mol %, and more particularly 100 mol %, of monomers containing (meth)acrylate groups, based on the total amount of the monomers used in the graft polymerization may be used.

The side chains described are introduced into the polymer after the preparation of a primary polyurethane resin dispersion. In this case, the polyurethane resin present in the primary dispersion may contain pendant and/or terminal olefinically unsaturated groups, via which the graft polymerization then proceeds with the olefinically unsaturated compounds. The polyurethane resin for grafting may thus be an unsaturated polyurethane resin (A). The graft polymerization is then a radical polymerization of olefinically unsaturated reactants. Also possible, for example, is for the olefinically unsaturated compounds used for the graft polymerization to comprise at least one hydroxyl group. In that case there may also first be an attachment of the olefinically unsaturated compounds via these hydroxyl groups, by reaction with free isocyanate groups of the polyurethane resin. This attachment takes place instead of or in addition to the radical reaction of the olefinically unsaturated compounds with the optionally present pendant and/or terminal olefinically unsaturated groups of the polyurethane resin. Afterward there is again the graft polymerization via radical polymerization as described earlier on above. What are obtained are, at any rate, polyurethane resins grafted with olefinically unsaturated compounds, preferably olefinically unsaturated monomers.

As olefinically unsaturated compounds with which the polyurethane resin (A) is grafted, it is possible to use virtually all radically polymerizable, olefinically unsaturated and organic monomers which are available to the skilled person for these purposes. The following may be mentioned as examples of certain specific classes of monomer:

hydroxyalkyl esters of (meth)acrylic acid or of other alpha,beta-ethylenically unsaturated carboxylic acids,
(meth)acrylic alkyl esters and/or cycloalkyl esters having up to 20 carbon atoms in the alkyl radical,
ethylenically unsaturated monomers comprising at least one acid group, more particularly precisely one carboxyl group, such as (meth)acrylic acid, for example,
vinyl esters of alpha-branched monocarboxylic acids having 5 to 18 carbon atoms,
reaction products of (meth)acrylic acid with the glycidyl ester of an alpha-branched monocarboxylic acid having 5 to 18 carbon atoms,
further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

In one or more embodiments, monomers containing (meth)acrylate groups may be used, and, hence, the grafted-on side chains are poly(meth)acrylate-based side chains.

The pendant and/or terminal olefinically unsaturated groups in the polyurethane resin, via which the graft polymerization with the olefinically unsaturated compounds is able to proceed, are introduced into the polyurethane resin via particular monomers. These particular monomers, in addition to an olefinically unsaturated group, further comprise, for example, at least one group which is reactive toward isocyanate groups. Hydroxyl groups and also primary and secondary amino groups are preferred. Hydroxyl groups are especially preferred.

It is of course also possible to employ the monomers described via which the pendant and/or terminal olefinically unsaturated groups can be introduced into the polyurethane resin without the polyurethane resin being subsequently and additionally grafted with olefinically unsaturated compounds. In one or more embodiments, the polyurethane resin may be grafted with olefinically unsaturated compounds.

The polyurethane resin may be a self-crosslinking and/or externally crosslinking binder. In one or more embodiments, the polyurethane resin comprises reactive functional groups through which external crosslinking is possible. In this case, the pigmented aqueous basecoat material comprises at least one crosslinking agent. More particularly, the reactive functional groups which enable external crosslinking are hydroxyl groups. With particular advantage it is possible in the context of the method of the invention to use polyhydroxy-functional polyurethane resins. This means that the polyurethane resin contains on average more than one hydroxyl group per molecule.

The polyurethane resin is prepared by the customary techniques of polymer chemistry. By these are meant, for example, the polymerization of polyisocyanates and polyols to polyurethanes, and the graft polymerization that then follows with olefinically unsaturated compounds. These techniques are known to the skilled person and can be adapted individually. Illustrative preparation processes and reaction conditions are found in European patent specification EP 0521 928 B1, page 2, line 57 to page 8, line 16.

If the basecoat materials used are present in the form of self-crosslinking systems, the polyurethane resin content is 50% to 100% by weight, or 50% to 90% by weight and more specifically 50% to 80% by weight, based on the film-forming solids of the basecoat material.

By film-forming solids is meant the nonvolatile weight fraction of the basecoat material, without pigments and any fillers. The film-forming solids can be determined as follows: a sample of the pigmented aqueous basecoat material (approximately 1 g) is admixed with 50 to 100 times the amount of tetrahydrofuran and then stirred for around 10 minutes. The insoluble pigments and any fillers are then removed by filtration, the residue is rinsed with a little THF, and the THF is removed from the resulting filtrate on a rotary evaporator. The residue of the filtrate is dried at 120° C. for two hours, and the resulting film-forming solids is weighed.

In the case of externally crosslinking systems, the polyurethane resin content is between 10% and 80% by weight, between 15% and 75% by weight and more specifically between 20% and 70% by weight, based in each case on the film-forming solids of the basecoat material.

In one or more embodiments, the polyurethane resin possesses a number-average molecular weight of 200 to 30 000 g/mol, specifically of 2000 to 20 000 g/mol (measured by gel permeation chromatography against a polystyrene standard, using tetrahydrofuran as eluent). It further possesses, for example, a hydroxyl number of 0 to 250 mg KOH/g, but more particularly of 20 to 150 mg KOH/g. In one or more embodiments, the acid number of the polyurethane resin is 5 to 200 mg KOH/g, more particularly 10 to 40 mg KOH/g. The hydroxyl number is determined in accordance with DIN/ISO 4629, the acid number in accordance with DIN 53402.

In one or more embodiments, the aqueous basecoat materials used in stage (1) of the method of the invention comprise at least one phosphite which is characterized by the structural formula (I):

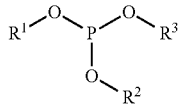

(I)

wherein at least one of the radicals $R^1$ to $R^3$ is selected from the group of the aliphatic hydrocarbons.

In one or more embodiments, two or all the radicals $R^1$ to $R^3$ to are selected from the group of the aliphatic hydrocarbons.

Where not all of the radicals $R^1$ to $R^3$ are selected from the group of the aliphatic hydrocarbons, the remaining radicals are selected from the group of the aromatic hydrocarbons. Said aromatic hydrocarbons may comprise a phenyl group. The above-identified aliphatic hydrocarbon radicals each comprise a $C_1$-$C_{20}$ radical, more specifically a $C_1$-$C_{18}$ radical and very specifically a $C_1$-$C_{16}$ radical.

In one or more embodiments, the aliphatic hydrocarbon comprises a linear or branched alkyl radical.

A linear or branched alkyl radical of this kind may be a $C_1$-$C_{20}$ radical, more specifically a $C_1$-$C_{18}$ radical and very specifically a $C_1$-$C_{16}$ radical.

In one or more embodiments, the alkyl radical is branched. Specifically the alkyl radical may be an isoalkyl radical of the general formula —(CH$_2$)$_n$—CH(CH$_3$)$_2$ with n=1 to 17. More specifically n=5 to 14 and very specifically n=6 to 12. This radical is for example an isodecyl or an isotridecyl radical.

In one specific embodiment, the phosphite is characterized by the structure of Formula (I), wherein all three radicals $R^1$ to $R^3$ are an isoalkyl radical of the general formula

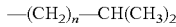

with n=6 to 12.

In another specific embodiment, the phosphite is characterized by the structure of Formula (I), wherein precisely two of the radicals $R^1$ to $R^3$ are an isoalkyl radical of the general formula

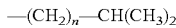

with n=6 to 12, and the remaining radical is a phenyl group.

In one or more embodiments, the at least one phosphite is selected from the group consisting of triisodecyl phosphite, triisotridecyl phosphite (=Mark® 305) and phenyl diisodecyl phosphite (=Mark® CH 300). Mark® 300 and Mark® 305 identify the brand names of the company Galata Chemicals.

The sum total of the weight percentage fractions of all of the phosphites of structural formula (I) is 0.1% to 5% by weight, specifically 0.1% to 4.5% by weight and more specifically 0.15% to 4% by weight, based on the total weight of the aqueous basecoat material applied in stage (1).

Where the sum total of the weight percentage fractions of all of the phosphites of structural formula (I) is less than 0.1% by weight, based on the total weight of the aqueous basecoat material applied in stage (1), the object on which the invention is based is not achieved. Where the sum total of the weight percentage fractions of all of the phosphites of structural formula (I) is more than 5% by weight, based on the total weight of the aqueous basecoat material applied in stage (1), disadvantages occur, such as, for example, a deterioration in adhesion in the case of underbaked systems.

The sum total of the weight percentage fractions of all of the phosphites of structural formula (I) is 0.1% to 5% by weight, based on the total weight of the aqueous basecoat material applied in stage (1). Where preferred embodiments of said phosphite are used, the sum total of the weight percentage fractions of all the preferred embodiments of said phosphite is preferably likewise 0.1% to 5% by weight, based on the total weight of the aqueous basecoat material applied in stage (1). With particular preference the aqueous basecoat material applied in stage (1) comprises, as phosphite, exclusively preferred embodiments of said phosphite.

In one specific embodiment, the sum total of the weight percentage fractions of all of the phosphites of structural formula (I) is 0.1% to 4.5% by weight, based on the total weight of the aqueous basecoat material applied in stage (1). Where preferred embodiments of said phosphite are used, the sum total of the weight percentage fractions of all the preferred embodiments of said phosphite is preferably likewise 0.1% to 4.5% by weight, based on the total weight of the aqueous basecoat material applied in stage (1). With particular preference the aqueous basecoat material applied in stage (1) comprises, as phosphite, exclusively preferred embodiments of said phosphite.

In one embodiment, the sum total of the weight percentage fractions of all of the phosphites of structural formula (I) is 0.15% to 4% by weight, based on the total weight of the aqueous basecoat material applied in stage (1). Where preferred embodiments of said phosphite are used, the sum total of the weight percentage fractions of all the preferred embodiments of said phosphite is preferably likewise 0.15% to 4% by weight, based on the total weight of the aqueous basecoat material applied in stage (1). With particular preference the aqueous basecoat material applied in stage (1) comprises, as phosphite, exclusively preferred embodiments of said phosphite.

As an example of embodiments of said phosphite that are preferred in this context, mention may be made of phosphites of the structural formula (I) where all three radicals $R^1$ to $R^3$ are an isoalkyl radical of the general formula

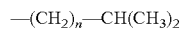

with n=6 to 12.

As another example of embodiments of said phosphite that are preferred in this context, mention may be made of phosphites of the structural formula (I) where precisely two of the radicals $R^1$ to $R^3$ are an isoalkyl radical of the general formula

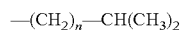

with n=6 to 12, and the remaining radical is a phenyl group.

As a further example of embodiments of said phosphite that are preferred in this context, mention may be made of triisodecyl phosphite, triisotridecyl phosphite, and phenyl diisodecyl phosphite.

In one or more embodiments, there is also a thickener present. Suitable thickeners are inorganic thickeners from the group of the phyllosilicates. Besides the inorganic thickeners, however, it is also possible to use one or more organic thickeners. These are may be selected from the group consisting of (meth)acrylic acid-(meth)acrylate copolymer thickeners, such as, for example, the commercial product Viscalex HV30 (Ciba, BASF), and polyurethane thickeners, such as, for example, the commercial product DSX® 1550 from Cognis. (Meth)acrylic acid-(meth)acrylate copolymer thickeners are those which in addition to acrylic acid and/or methacrylic acid also comprise in copolymerized form one or more acrylic esters (i.e. acrylates) and/or one or more methacrylic esters (i.e. methacrylates). A feature common to the (meth)acrylic acid-(meth)acrylate copolymer thickeners is that in alkaline medium, in other words at pH levels >7, more particularly >7.5, they exhibit a sharp rise in viscosity, owing to salt formation by the acrylic acid and/or methacrylic acid, in other words the formation of carboxylate groups. Where (meth)acrylic esters are used that are formed from (meth)acrylic acid and a $C_1$-$C_6$ alkanol, the resulting (meth)acrylic acid-(meth)acrylate copolymer thickeners are substantially nonassociative in their effect, such as the aforementioned Viscalex HV30, for example. Substantially nonassociative (meth)acrylic acid-(meth)acrylate copolymer thickeners are also referred to in the literature as ASE thickeners (alkali-soluble/swellable emulsion or dispersion). As (meth)acrylic acid-(meth)acrylate copolymer thickeners it is also possible, however, to use those referred to as HASE thickeners (hydrophobically modified anionic soluble emulsions or dispersions). These are obtained if the alkanol used, instead of or in addition to the $C_1$-$C_6$ alkanols, comprises alkanols having a greater number of carbon atoms, for example 7 to 30, or 8 to 20 carbon atoms. HASE thickeners have a substantially associative thickening effect. On the basis of their thickening properties, the (meth)acrylic acid-(meth)acrylate copolymer thickeners that can be used are not suitable as binder resins, and hence are not included among the physically, thermally or both thermally and actinically curable binders that are identified as binders, and they are therefore explicitly different from the poly(meth)acrylate-based binders which can be used in the basecoat compositions of the invention. Polyurethane thickeners are the associative thickeners referred to in the literature as HEUR (hydrophobically modified ethylene oxide urethane rheology modifiers). In chemical terms these are nonionic branched or nonbranched block copolymers of polyethylene oxide chains (sometimes also polypropylene oxide chains) which are linked to one another via urethane bonds and which carry terminal long-chain alkyl or alkylene groups having 8 to 30 carbon atoms. Examples of typical alkyl groups are dodecyl or stearyl groups; an example of a typical alkenyl group is an oleyl group; a typical aryl group is the phenyl group; and an example of a typical alkylated aryl group is a nonylphenyl group. On account of their thickening properties and structure, the polyurethane thickeners are not suitable as physically, thermally or both thermally and physically curable binder resins. They are therefore explicitly different from the polyurethanes which can be used as binders in the basecoat compositions of the invention.

The pigmented aqueous basecoat material further comprises at least one polyester, more particularly a polyester having a number-average molecular weight of 400 to 5000 g/mol (measured by gel permeation chromatography against a polystyrene standard, using tetrahydrofuran as eluate). Corresponding polyesters are described in DE 4009858 in column 6, line 53 to column 7, line 61 and column 10, line 24 to column 13, line 3.

The pigmented aqueous basecoat material may further comprise at least one adjuvant. Examples of such adjuvants are salts which can be decomposed thermally without residue or substantially without residue, physically, thermally and/or actinic-radiation-curable resin binders that are different from polyurethane resins, further croslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, radical polymerization initiators, adhesion promoters, flow control agents, film-forming assistants, sag control agents (SCAs), flame retardants, corrosion inhibitors, waxes, siccatives, biocides, and matting agents.

Suitable adjuvants of the aforementioned kind are known for example from

German patent application DE 199 48 004 A1, page 14, line 4, to page 17, line 5, and German patent DE 100 43 405 C1, column 5, paragraphs [0031] to [0033].

They are used in the customary and known amounts.

The solids content of the basecoat materials used in accordance with the invention may vary according to the requirements of the case in hand. The solids content is guided primarily by the viscosity that is necessary for application, especially for spray application, and so may be adjusted by the skilled person on the basis of his or her common general knowledge, with the assistance where appropriate of a few rangefinding tests.

In one or more embodiments, the solids content of the basecoat materials is 5% to 70% by weight, more specifically 10% to 65% by weight, and with even more specificity 15% to 60% by weight.

The solids content is that weight fraction which remains as a residue on evaporation under defined conditions. In the present specification, the solids was determined in accordance with DIN EN ISO 3251. The measurement time was 60 minutes at 125° C.

The basecoat materials used in accordance with the invention can be prepared using the mixing assemblies and mixing methods that are customary and known for producing basecoat materials.

The basecoat materials of the invention can be employed as one-component (1K), two-component (2K) or multicomponent (3K, 4K) systems. 1K systems are preferred.

In one-component (1K) systems, binder and crosslinking agent are present alongside one another, i.e. in one component. A prerequisite for this is that the two constituents undergo crosslinking with one another only at relatively high temperatures and/or on exposure to actinic radiation.

In two-component (2K) systems, for example, binder and crosslinking agent are present separately from one another in at least two components, which are not combined until shortly before application. This form is selected when binder and crosslinking agent undergo reaction with one another even at room temperature. Coating materials of this kind are employed especially for coating thermally sensitive substrates, more particularly in automotive refinish.

The pigmented aqueous basecoat material used in accordance with the invention may be applied to a substrate in the film thicknesses that are customary in the context of the automobile industry in the range, for example, of 5 to 100 micrometers, preferably 5 to 60 micrometers. This is done by employing, for example, the known methods such as spraying, knifecoating, spreading, pouring, dipping, impregnating, trickling or rolling. It is preferred to employ spray application methods, such as, for example, compressed air spraying, airless spraying, high speed rotation, or electrostatic spray application (ESTA), optionally combined with hot spray application such as hot air spraying, for example.

After the pigmented aqueous basecoat material has been applied, it can be dried by known techniques. For example, 1K basecoat materials can be flashed off at room temperature for 1 to 60 minutes and subsequently dried preferably at optionally slightly elevated temperatures of 30 to 80° C. Flashing off and drying in the context of the present invention means the evaporation of organic solvents and/or water whereby the coating material becomes dryer but is not yet cured. Or as yet no fully crosslinked coating film is formed.

A commercially customary clearcoat material is then applied likewise by commonplace techniques, the film thicknesses again lying in the commonplace ranges, such as 5 to 100 micrometers, for example. Clearcoat materials of this kind are known to the skilled person.

After the clearcoat has been applied, it can be flashed off at room temperature for 1 to 60 minutes, for example, and optionally dried. The clearcoat material is then cured together with the applied pigmented basecoat material. Here, for example, crosslinking reactions take place, producing a multicoat color and/or effect paint system of the invention on a substrate. Curing takes place preferably thermally, or both thermally and with actinic radiation, at temperatures from 80 to 200° C.

The method of the invention can be used to coat metallic and nonmetallic substrates, more particularly plastics substrates, preferably automobile bodies or parts thereof.

The invention further provides a multicoat color and/or effect paint system which is producible by the method of the invention. Therefore, the observations above with regard to the aqueous basecoat material which is used for example in stage (1) of the method of the invention for producing a multicoat color and/or effect paint system, and also concerning the phosphite that is present therein, apply equally to the multicoat color and/or effect paint system in question. This is true more particularly also for all of the stated preferred, more preferred and very preferred features.

The present invention further relates to the above-described method for repairing defects on the multicoat color and/or effect paint systems of the invention, where in stage (1) a pigmented aqueous basecoat material is used which comprises at least one phosphite of the following structural formula (I):

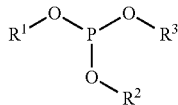
(I)

where at least one of the radicals $R^1$ to $R^3$ is selected from the group of the aliphatic hydrocarbons and, moreover, the sum total of the weight percentage fractions of all of the phosphites of structural formula (I) is 0.1% to 5% by weight, based on the total weight of the aqueous basecoat material applied in stage (1).

It is preferred for the aqueous basecoat material used in stage (1) of the method of the invention for repairing defects to be the same as that which is used in the method of the invention for producing a multicoat color and/or effect paint system. The above observations concerning the aqueous basecoat material therefore also apply to the method in question for repairing defects on a multicoat color and/or effect paint system. This is especially true also for all stated preferred, more preferred and very preferred features.

As is known, the multicoat color and/or effect paint systems produced using the method of the invention may exhibit defects. Defects, or film defects, are generally disruptions to and in the coating, and are usually named according to their shape or their appearance. The skilled person knows of a multiplicity of possible kinds of such film defects. They are described for example in Römpp-Lexikon Lacke and Druckfarben, Georg Thieme Verlag, Stuttgart, N.Y., 1998, page 235, "Film defects".

Said defects may be repaired by the above-described method of the invention.

Before the pigmented aqueous basecoat material is applied, the defect can be abraded.

Application of the pigmented aqueous basecoat material to the defect in the original finish is accomplished by pneumatic atomization. Following the application of the pigmented aqueous basecoat material, it can be dried by known techniques. For example, the basecoat material can be dried at room temperature for 1 to 60 minutes and subsequently dried at optionally slightly elevated temperatures of 30 to 80° C. Flashing off and drying in the context of the present invention means the evaporation of organic solvents and/or water, as a result of which the paint becomes dryer, but is not yet cured, or as yet no fully crosslinked coating film is formed.

A commercially customary clearcoat material is then applied, by techniques that are likewise commonplace, to the site of the intended repair. As is generally customary in refinishing and therefore known to the skilled person, it is preferred to use clearcoat materials which can be cured even at relatively low temperatures of 30 to 80° C. Two-component clearcoat materials in particular are suitable for this purpose.

After the clearcoat has been applied it can be flashed off at room temperature for 1 to 60 minutes, for example, and optionally dried. The clearcoat material is then cured together with the applied pigmented basecoat material. Curing is accomplished preferably thermally or both thermally and with actinic radiation at temperatures from 30 to 80° C.

The invention further provides a pigmented aqueous basecoat material which is characterized in that the basecoat material comprises at least one phosphite of the following structural formula (I):

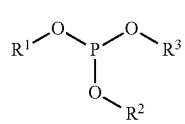
(I)

wherein at least one of the radicals $R^1$ to $R^3$ is selected from the group of the aliphatic hydrocarbons and, furthermore, the sum total of the weight percentage fractions of all of the phosphites of structural formula (I) is 0.1% to 5% by weight, based on the total weight of the pigmented aqueous basecoat material.

This pigmented aqueous basecoat material is suitable more particularly for producing multicoat color and/or effect paint systems. The above observations concerning the aqueous basecoat material which is used for example in stage (1) of the method of the invention for producing a multicoat color and/or effect paint system, and also concerning the phosphite present therein, therefore apply equally to the pigmented aqueous basecoat material in question. This is so in particular also for all above preferred, more preferred and very preferred features.

The present invention additionally provides, furthermore, the use of at least one phosphite in pigmented aqueous basecoat materials for improving the stability toward moisture exposure, and is characterized in that the said basecoat material comprises at least one phosphite of the following structural formula (I):

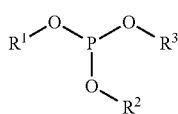

(I)

wherein at least one of the radicals $R^1$ to $R^3$ is selected from the group of the aliphatic hydrocarbons and, furthermore, the sum total of the weight percentage fractions of all of the phosphites of structural formula (I) is 0.1% to 5% by weight, based on the total weight of the pigmented aqueous basecoat material.

An improvement in stability toward moisture exposure means an improvement in comparison to those pigmented aqueous basecoat materials which do not comprise phosphite for use in accordance with the invention. The moisture exposure can be simulated with the aid for example of the EN ISO 6270-2.

All of the above observations concerning the aqueous basecoat material which is used for example in stage (1) of the method of the invention for producing a multicoat color and/or effect paint system, and also concerning the phosphite present therein, therefore apply equally to the inventive use of at least one phosphite in pigmented aqueous basecoat materials. This is so in particular also for all above preferred, more preferred and very preferred features.

The said phosphite may be used in refinish for improving the stability toward moisture exposure. By this is meant more particularly that after a moisture exposure there are no longer any defects such as swelling or blistering.

The invention is elucidated below by means of examples.

Examples

1. Preparation of a Silver Waterborne Basecoat Material 1

The components listed under "aqueous phase" in table A are combined with stirring in the order stated to form an aqueous mixture. In the next step, an organic mixture is prepared from the components listed under "organic phase". The organic mixture is added to the aqueous mixture. The combined mixture is then stirred for 10 minutes and is adjusted using deionized water and dimethylethanolamine to a pH of 8 and to a spray viscosity of 58 mPas under a shearing load of 1000/sec as measured using a rotary viscometer (Rheomat RM 180 instrument from Mettler-Toledo) at 23° C.

TABLE A

| Component | Parts by weight |
|---|---|
| Aqueous phase | |
| 3% strength Na Mg phyllosilicate solution | 26 |
| Deionized water | 3 |
| Butyl glycol | 1.75 |
| Polyurethane acrylate; prepared as per page 7 line 55-page 8 line 23 of DE-A-4437535 | 4.5 |

TABLE A-continued

| Component | Parts by weight |
|---|---|
| 50% strength by weight solution of DSX 1550 (BASF), rheological agent | 0.6 |
| Polyester; prepared as per example D, column 16, lines 37-59 of DE-A-4009858 | 3.2 |
| Tensid S (BASF), surfactant | 0.3 |
| Butyl glycol | 0.55 |
| Cymel 203; melamine-formaldehyde resin, available from Cytec | 4.1 |
| 10% strength dimethylethanolamine in water | 0.3 |
| Deionized water | 6 |
| Polyurethane acrylate; prepared as per page 19, line 44-page 20, line 21 of DE-A-19948004 | 20.4 |
| Tensid S (BASF), surfactant | 1.6 |
| Butyl glycol | 0.5 |
| 3% by weight aqueous Viscalex HV 30 solution; rheological agent, available from BASF, in water | 3.9 |
| Organic phase | |
| Mixture of two commercial aluminum pigments, available from Altana-Eckart | 6.2 |
| Butyl glycol | 7.5 |
| Polyester; prepared as per example D, column 16, lines 37-59 of DE-A-4009858 | 5 |

Waterborne Basecoat Material I1:

To prepare the inventive waterborne basecoat material I1 waterborne basecoat material 1 was admixed with 0.5 part by weight of commercially available triisodecyl phosphite.

Waterborne Basecoat Material I2:

To prepare the inventive waterborne basecoat material I2, waterborne basecoat material 1 was admixed with 1 part by weight of commercially available triisodecyl phosphite.

Waterborne Basecoat Material I3:

To prepare the inventive waterborne basecoat material I3, waterborne basecoat material 1 was admixed with 2 parts by weight of commercially available triisodecyl phosphite.

Waterborne Basecoat Material I4:

To prepare the inventive waterborne basecoat material I4, waterborne basecoat material 1 was admixed with 1 part by weight of commercially available triisotridecyl phosphite.

Waterborne Basecoat Material I5:

To prepare the inventive waterborne basecoat material I5, waterborne basecoat material 1 was admixed with 1 part by weight of commercially available phenyl diisodecyl phosphite.

TABLE 1

Compositions of waterborne basecoat materials 1 and I1 to I5

| WBM | [% by weight] | Phosphite |
|---|---|---|
| 1 | — | — |
| I1 | 0.5 | Triisodecyl phosphite |
| I2 | 1 | Triisodecyl phosphite |
| I3 | 2 | Triisodecyl phosphite |
| I4 | 1 | Triisotridecyl phosphite (=Mark CH 305) |
| I5 | 1 | Phenyl diisodecyl phosphite (=Mark CH 300) |

The weight percentages in table 1 relate to the fraction of the phosphite in the respective waterborne basecoat material.

Comparative Test Between Waterborne Basecoat Material 1 and Waterborne Basecoat Materials I1 to I5

For determining the stability against the incidence of blisters and swelling after condensation water storage, the multicoat paint systems were produced in accordance with the following general instructions:

A steel panel coated with a standard cathodic electrocoat (Cathoguard® 800 from BASF Coatings GmbH) and with dimensions of 10×20 cm was coated with a standard primer-surfacer (ALG 670173 mid-gray primer-surfacer from Hemmelrath). Following interim drying of the aqueous primer-surfacer over a period of 10 minutes at 80° C., it was baked at a temperature of 190° C. over a period of 30 minutes.

The waterborne basecoat material was then applied pneumatically. The resulting waterborne basecoat material film was flashed off at room temperature for 2 minutes and subsequently dried in a forced-air oven at 70° C. for 10 minutes. Applied over the dried waterborne basecoat film was a customary two-component clearcoat material (Progloss® 345 from BASF Coatings GmbH). The resulting clearcoat film was flashed off at room temperature for 20 minutes. The waterborne basecoat film and the clearcoat film were subsequently cured in a forced-air oven at 160° C. for 30 minutes. The present system represents an overbaked original system and is referred to hereinafter as original finish.

This original finish is abraded with an abrasive paper and then the waterborne basecoat material is applied pneumatically to this abraded original finish. The resulting waterborne basecoat film was flashed off at room temperature for 2 minutes and then dried in a forced-air oven at 70° C. for 10 minutes. Applied to the dried waterborne basecoat film was an 80° C. two-component clearcoat material (FF230500 2K refinish clearcoat, scratch-resistant, from BASF Coatings GmbH). The resulting clearcoat film was flashed off at room temperature for 20 minutes. Subsequently the waterborne basecoat film and the clearcoat film were cured in a forced-air oven at 80° C. for 30 minutes.

The steel panels thus treated were then stored over a period of 10 days in an atmosphere chamber in accordance with EN ISO 6270-2. The panels were subsequently inspected for blistering and swelling, directly and 24 hours after removal from the atmosphere chamber. The results of the inspection of the test panels directly after removal from the atmosphere chamber and 24 hours after removal from the atmosphere chamber are no different. The results for 24 hours are shown in table 2.

The occurrence of blisters was assessed as follows by a combination of 2 values:

The number of blisters was evaluated by a quantity figure from 1 to 5, with m1 identifying very few blisters and m5 a very large number of blisters.

The size of the blisters was evaluated by a size figure likewise from 1 to 5, with g1 denoting very small blisters and g5 denoting very large blisters.

The identification m0g0, accordingly, denotes a finish which is blister-free after storage in an atmosphere chamber, and is a satisfactory result in terms of blistering.

TABLE 2

Blisters/swelling of waterborne basecoat material 1 and waterborne basecoat materials I1 to I5

| WBM | Blistering | Swelling | Assessment |
|---|---|---|---|
| 1 | m5g1 | none | unsat. |
| I1 | m0g0 | none | sat. |
| I2 | m0g0 | none | sat. |
| I3 | m0g0 | none | sat. |

TABLE 2-continued

Blisters/swelling of waterborne basecoat material 1 and waterborne basecoat materials I1 to I5

| WBM | Blistering | Swelling | Assessment |
|---|---|---|---|
| I4 | m0g0 | none | sat. |
| I5 | m0g0 | none | sat. |

Key:
m = number of blisters
g = size of blisters
sat. = satisfactory result
unsat. = unsatisfactory result The results confirm that when using the phosphites of the invention there are no longer any blisters after condensation water exposure and no instances of swelling are visible any longer.

What is claimed is:

1. A method for reducing reversible defects in a multicoat color and/or effect paint system after moisture exposure, the method comprising
    (1) applying a pigmented aqueous basecoat material to a substrate, wherein a binder component of the pigmented aqueous basecoat material comprises at least one saturated or unsaturated polyurethane (meth)acrylate resin and at least one polyester;
    (2) drying the pigmented aqueous basecoat material applied to the substrate in stage (1) without curing;
    (3) applying a clearcoat material to the dried pigmented aqueous basecoat; and subsequently
    (4) curing the dried pigmented aqueous basecoat film together with the clearcoat,
    wherein in stage (1) a phosphite component of the pigmented aqueous basecoat material consists of at least one phosphite of the following structural formula (I):

wherein structural formula (I) is selected from the group consisting of triisodecyl phosphite, triisotridecyl phosphite and phenyl diisodecyl phosphite, and wherein the sum total of the weight percentage fractions of all of the phosphites of structural formula (I) is 0.15% to 4% by weight, based on the total weight of the aqueous basecoat material applied in stage (1).

2. The method of claim 1, wherein the sum total of the weight percentage fractions of all of the phosphites of structural formula (I) is 0.5% to 2% by weight, based on the total weight of the aqueous basecoat material applied in stage (1).

3. The method of claim 1, wherein in stage (1) the pigmented aqueous basecoat material comprises at least one crosslinking agent selected from the group consisting of amino resins and blocked or nonblocked polyisocyanates.

4. The method of claim 1, wherein the polyurethane resin is a graft polymer.

5. The method of claim 1, wherein the polyurethane resin is hydrophilically stabilized.

6. The method of claim 1, wherein said method consists of:
- said (1) applying,
- said (2) drying,
- said (3) applying,
- after the clearcoat has been applied to the dried pigmented aqueous basecoat in (3) and before any curing, optionally flashing off the clearcoat and optionally drying the clearcoat, and
- said (4) curing.

7. The method of claim 1 which is a method for repairing a defect on the multicoat color and/or effect paint system, the method comprising
- (1) applying the pigmented aqueous basecoat material to the defect, wherein a binder component of the pigmented aqueous basecoat material comprises at least one saturated or unsaturated polyurethane (meth)acrylate resin and at least one polyester;
- (2) drying the pigmented aqueous basecoat material applied to the defect in stage (1) without curing;
- (3) applying a clearcoat material to the dried pigmented aqueous basecoat; and subsequently
- (4) curing the dried pigmented aqueous basecoat film together with the clearcoat,
- wherein in stage (1) a phosphite component of the pigmented aqueous basecoat material consists of at least one phosphite of the following structural formula (I):

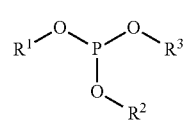
(I)

wherein structural formula (I) is selected from the group consisting of triisodecyl phosphite, triisotridecyl phosphite and phenyl diisodecyl phosphite, and wherein the sum total of the weight percentage fractions of all of the phosphites of structural formula (I) is 0.15% to 4% by weight, based on the total weight of the aqueous basecoat material applied in stage (1).

8. The method of claim 7, wherein in stage (1) the pigmented aqueous basecoat material comprises at least one crosslinking agent selected from the group consisting of amino resins and blocked or nonblocked polyisocyanates.

9. The method of claim 7, wherein said method consists of:
- said (1) applying,
- said (2) drying,
- said (3) applying,
- after the clearcoat has been applied to the dried pigmented aqueous basecoat in (3) and before any curing, optionally flashing off the clearcoat and optionally drying the clearcoat, and
- said (4) curing.

* * * * *